United States Patent
Odate

(10) Patent No.: US 10,926,772 B2
(45) Date of Patent: Feb. 23, 2021

(54) DRIVING ASSISTANCE DEVICE

(71) Applicant: HONDA MOTOR CO., LTD., Tokyo (JP)

(72) Inventor: Shotaro Odate, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 176 days.

(21) Appl. No.: 16/316,831

(22) PCT Filed: Jul. 12, 2016

(86) PCT No.: PCT/JP2016/070508
§ 371 (c)(1),
(2) Date: Jan. 10, 2019

(87) PCT Pub. No.: WO2018/011871
PCT Pub. Date: Jan. 18, 2018

(65) Prior Publication Data
US 2019/0241189 A1 Aug. 8, 2019

(51) Int. Cl.
*B60W 50/04* (2006.01)
*B62D 5/00* (2006.01)
(Continued)

(52) U.S. Cl.
CPC .............. *B60W 40/08* (2013.01); *B60L 1/00* (2013.01); *B60W 50/04* (2013.01);
(Continued)

(58) Field of Classification Search
CPC .... B66F 9/063; B66F 9/0755; B66F 9/07581; B66F 9/24; G05D 1/0088; G05D 1/0291
See application file for complete search history.

(56) References Cited

U.S. PATENT DOCUMENTS

2011/0231064 A1* 9/2011 Abe ..................... B62D 5/0463
701/41
2017/0349185 A1* 12/2017 McNew .................. B60Q 9/00

FOREIGN PATENT DOCUMENTS

JP 2007-168720 A 7/2007
JP 2010-036656 A 2/2010
(Continued)

OTHER PUBLICATIONS

Machine translation of JP-2010036656-A (Year: 2010).*
PCT/ISA/210 from International Application Publication of PCT/JP2016/070508 with the English translation thereof.

*Primary Examiner* — Tyler J Lee
*Assistant Examiner* — Yufeng Zhang
(74) *Attorney, Agent, or Firm* — Carrier Blackman & Associates, P.C.; Joseph P. Carrier; Jeffrey T. Gedeon

(57) ABSTRACT

Provided is a driving assistance device such that even if the main power supply voltage of a main electricity storage device becomes less than or equal to the operable voltage of a device for monitoring the state of a driver, interruptions in driving assistance are prevented. While a voltage reduction state in which the main power supply voltage of the main electricity storage device is equal to or less than the operable voltage of the driver state monitoring device is continuing, the state of the driver is monitored by a device (steering torque sensor) that operates with the auxiliary power supply voltage of an auxiliary electricity storage device, such as a capacitor. Thus, it is possible to monitor whether or not the driver is a so-called Driver in the Loop and continue driving assistance even while the voltage reduction state of the main power supply voltage is continuing.

4 Claims, 7 Drawing Sheets

(51) Int. Cl.
*B60W 40/08* (2012.01)
*B62D 6/00* (2006.01)
*B60L 1/00* (2006.01)
*G08G 1/16* (2006.01)
*B62D 5/04* (2006.01)

(52) U.S. Cl.
CPC ............ *B62D 5/0457* (2013.01); *B62D 6/00* (2013.01); *G08G 1/16* (2013.01); *B60W 2040/0818* (2013.01)

(56) References Cited

FOREIGN PATENT DOCUMENTS

| JP | 2011-084230 A | 4/2011 |
| JP | 2012-111412 A | 6/2012 |
| JP | 2013-163515 A | 8/2013 |

\* cited by examiner

FIG. 4

| MAIN SWITCH 49 | VEHICLE STATE | SWITCH FOR ELECTRIC DEVICE 203 | SWITCH FOR DRIVING DEVICE 204 | SWITCH FOR STARTER MOTOR 206 | ALTERNATOR 212 |
|---|---|---|---|---|---|
| ON | TRAVELING | CLOSED | CLOSED | OPEN | POWER GENERATION / NON POWER GENERATION |
| ON | IDLE STOP | CLOSED | OPEN | OPEN | NON POWER GENERATION |
| ON | CRANKING (RETURN FROM IDLE STOP) VOLTAGE REDUCTION (Vb<Vactth) | | OPEN | CLOSED (CRANKING) | (POWER GENERATION) |
| OFF | SOAKING | OPEN | OPEN | OPEN | NON POWER GENERATION |

250

DRIVING ASSISTANCE DEVICE

TECHNICAL FIELD

The present invention relates to a driving assistance device that is suitably applied to a vehicle having a driving assistance function that assists a driver in driving the vehicle.

BACKGROUND ART

In recent years, an automated driving vehicle including a plurality of function devices that assist a driver in driving the vehicle has been suggested.

For example, Japanese Laid-Open Patent Publication No. 2007-168720 discloses a technique where, in an automated driving vehicle that reduces a burden of a driver in driving, a steering assistance process is prohibited when it is recognized that steering torque by the driver who grips a steering has decreased, that is, driving intention of the driver has decreased (in the paragraphs [0059], [0062] in Japanese Laid-Open Patent Publication No. 2007-168720).

SUMMARY OF INVENTION

In a general automated driving vehicle having a driving assistance function, a prerequisite of the driving assistance is that a driver is in what is called the driver-in-the-loop (state where the driver monitors the periphery) as a result of monitoring the state of the driver in the vehicle.

The monitoring of the driver's state in the vehicle is performed in a manner that a control device analyzes the content of an output signal from a monitoring device that monitors the driver's state. This monitoring device operates using energy storage voltage of an energy storage device in the vehicle as power source voltage.

Incidentally, it is predicted that an automation ratio will increase in future as typified by, for example, automated following in a traffic jam. In this case, it is considered that a known idle stop technique is performed in the traffic jam in order to save fuel consumption.

However, it has been discovered that a state may occur where the power source voltage from a battery applied to an on-vehicle device temporarily decreases to be lower than or equal to an operation possible voltage of the monitoring device, in engine cranking on returning from an idle stop state.

If power source supply to the monitoring device is stopped, detection of the driver's state cannot be performed normally. As a result, there is a problem that the driving assistance (automated driving) is interrupted.

The present invention has been made in view of such a problem, and an object is to provide a driving assistance device that can prevent the driving assistance (automated driving) from being interrupted even when power source voltage of an energy storage device temporarily becomes lower than or equal to operation possible voltage of a monitoring device that monitors a driver's state.

A driving assistance device according to the present invention includes a control device configured to enable a driving assistance function of a vehicle only when a state of a driver monitored by a driver state monitoring device is in a predetermined state, a main power source voltage being applied from a main energy storage device of the vehicle to the driver state monitoring device, wherein when variation of the main power source voltage is predicted, the control device is configured to change a normal technique for monitoring the state of the driver to a different technique until a prediction of the variation of the main power source voltage is cancelled.

According to the present invention, when the variation of the main power source voltage is predicted, the normal technique for monitoring the state of the driver is changed to the different technique until the prediction of the variation of the main power source voltage is cancelled. Therefore, even in a period in which the variation of the main power source voltage is predicted, it can be monitored whether the driver is in what is called the driver-in-the-loop state (where the driver monitors the periphery), and the driving assistance (automated driving) can be continued.

In this case, the driver state monitoring device may be at least one of monitoring devices that are a driver camera and a contact sensor, the driver camera provided in the vehicle and configured to photograph the driver, the contact sensor provided for a steering part.

The state of a driver's face and the like can be monitored by the driver camera, and a steering gripping state of the driver can be monitored by the contact sensor.

Note that the prediction of the variation of the main power source voltage is performed when a condition of an idle stop is satisfied or a condition of a return from the idle stop is satisfied.

In the idle stop and the return from the idle stop, the main energy storage device is not charged. Thus, it is predicted that the main power source voltage decreases. In this case as well, the normal technique for monitoring the state of the driver is changed to the different technique until the prediction of the variation of the main power source voltage is cancelled. Therefore, even in the period in which the variation of the main power source voltage is predicted, it can be monitored whether the driver is in what is called the driver-in-the-loop (state where the driver monitors the periphery), and the driving assistance (automated driving) can be continued.

The prediction of the variation of the main power source voltage may be performed on a basis of a voltage reduction state where the main power source voltage is lower than an operation possible voltage of the driver state monitoring device, and in a period in which the voltage reduction state continues, the state of the driver may be monitored by a device other than the driver state monitoring device.

The voltage reduction state where the main power source voltage is lower than the operation possible voltage of the driver state monitoring device is predicted. If the prediction of the voltage reduction state is made, and in the period in which the voltage reduction state continues, then the state of the driver is monitored by the device other than the driver state monitoring device. Therefore, even in the period in which the voltage reduction state of the main power source voltage continues, it can be monitored whether the driver is in what is called the driver-in-the-loop state (where the driver monitors the periphery), and the driving assistance (automated driving) can be continued. As a result, the merchantability of the vehicle can be improved.

A driving assistance device according to the present invention includes a control device configured to enable a driving assistance function only when a state of a driver who is monitored by a driver state monitoring device to which main power source voltage is applied from a main energy storage device of a vehicle is in a predetermined state, wherein when variation of the main power source voltage is predicted, the control device is configured to change a normal technique for monitoring the state of the driver to a different technique until the prediction of the variation of the main power source voltage is cancelled. It is preferable that: the driver state monitoring device is a contact sensor that is provided for a steering part; the driving assistance device further includes an electric power steering device including a steering torque sensor, and an auxiliary energy storage device; the prediction of the variation of the main power source voltage is performed when a condition of an idle stop is satisfied or a condition of a return from the idle stop is satisfied; and the control device is configured to, in the return from the idle stop, apply an auxiliary power source voltage from the auxiliary energy storage device to the electric power steering device, and change the normal technique for monitoring the state of the driver by an output from the contact sensor to a technique for monitoring by an output from the steering torque sensor.

For example, in the return from the idle stop during a low speed following automated traveling, it can be determined whether the driver is in what is called the driver-in-the-loop state (where the driver monitors the periphery) by the output from the steering torque sensor that is operated by the auxiliary energy storage device instead of the output of the contact sensor that is probably inoperable. Therefore, it is possible to prevent the driving assistance function from being cancelled in the return period from the idle stop.

BRIEF DESCRIPTION OF DRAWINGS

FIG. 4 is an explanatory view that shows a relation of a state of the vehicle, an open/closed state of each switch, and an operation state of an alternator;

DESCRIPTION OF EMBODIMENT

Detailed description is hereinafter given concerning a preferred embodiment in a relation between a driving assistance device according to the present invention and a vehicle that includes the driving assistance device with reference to the attached drawings.

Note that, in the present invention, the vehicle having a driving assistance function is a vehicle in which at least one function of acceleration/deceleration, braking, and steering is automatically performed by a control device of the vehicle on the premise that a driver is in what is called the driver-in-the-loop (state where the driver monitors the periphery).

[Structure]

Figure 1:
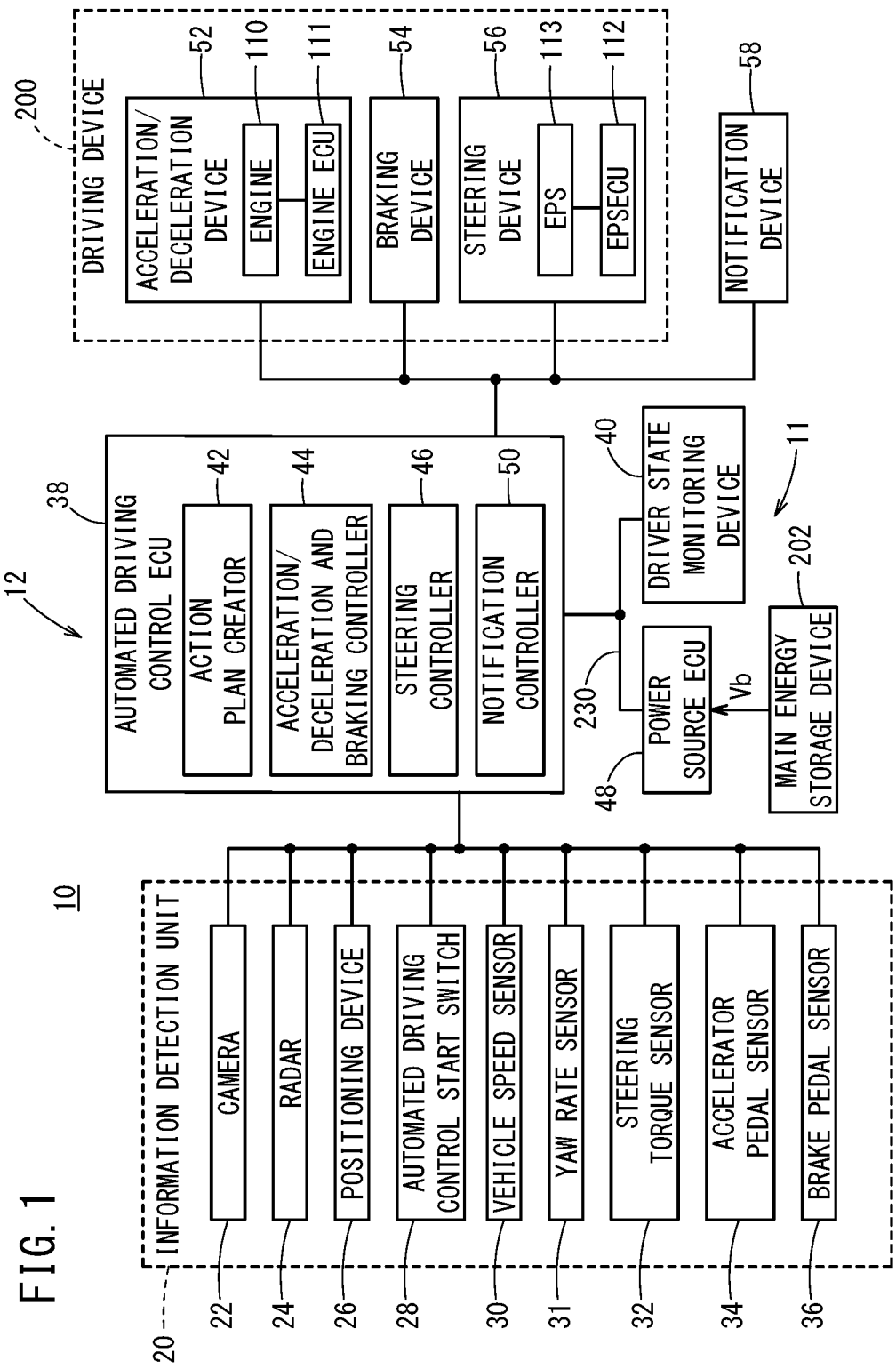
FIG. 1 is a block diagram that illustrates a schematic structure of a vehicle including a driving assistance device according to an embodiment.

FIG. 1 is a block diagram that illustrates a schematic structure of a vehicle 10 including a driving assistance device 11 according to an embodiment.

The driving assistance device 11 basically includes a driver state monitoring device 40, a power source ECU 48, and an automated driving control ECU 38.

Figure 2:
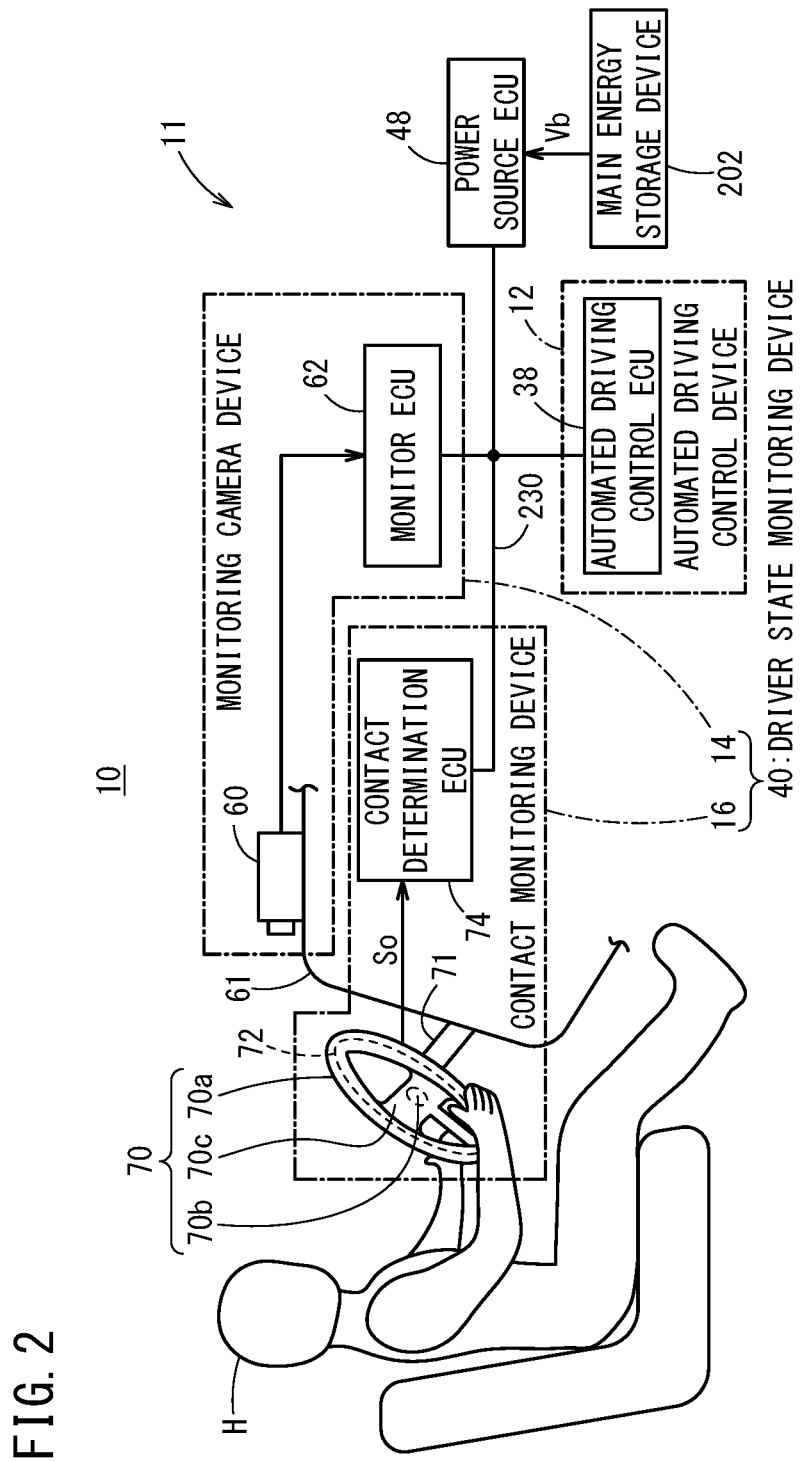
FIG. 2 is a schematic diagram that illustrates a structure of a driver state monitoring device that monitors a state of a driver in the vehicle.

FIG. 2 is a schematic diagram that illustrates a structure of the driver state monitoring device 40 that monitors the state of a driver H.

The driving assistance functions by the vehicle 10 include, for example, an inter-vehicle distance control function (what is called the ACC function), a lane keeping function (what is called the LKAS function), an automated lane change function (what is called the ALC function), and the like that are performed by combining an automated acceleration/deceleration operation, an automated braking operation, and an automated steering operation. The vehicle 10 having these driving assistance functions is configured such that the driving assistance functions can operate while the driver state monitoring device 40 determines that the state of the driver H is normal.

As illustrated in FIG. 1 and FIG. 2, the vehicle 10 includes an automated driving control device 12 that controls automated driving of the vehicle 10, and the driver state monitoring device 40 that monitors whether the driver H is in what is called the driver-in-the-loop state (where the driver H monitors the periphery).

As illustrated in FIG. 2, the driver state monitoring device 40 includes a monitoring camera device 14 and a contact monitoring device 16.

The monitoring camera device 14 includes a driver camera (driver photographing device) 60 and a monitor ECU 62 that detects, for example, a face direction of the driver H from an image signal that is output from the driver camera 60.

The contact monitoring device 16 includes a contact sensor (touch sensor) 72 provided for a steering wheel 70 and a contact determination ECU (contact determination electronic control unit) 74 that detects a contact with (or grip on) the steering wheel 70 by the driver H from an output signal from the contact sensor 72.

Note that an ECU (electronic control unit) is a computing machine including a microcomputer, and includes a CPU, a ROM (including an EEPROM), and a RAM, and moreover an input/output device such as an A/D converter and a D/A converter, a timer as a clocking unit, and the like. The ECU functions as various function achieving units such as a controller, a calculation unit, a processing unit, and the like when the CPU reads out programs recorded in the ROM and executes the programs. The function achieving unit can be formed by hardware (function achiever).

As illustrated in FIG. 1 and FIG. 2, the power source ECU (power source electronic control unit) 48, the driver state monitoring device 40, and the automated driving control ECU (automated driving control electronic control unit) 38 are connected with each other by a communication line 230 in the vehicle, and transmit/receive data through the communication line 230. The power source ECU 48 includes a voltage sensor that detects main power source voltage Vb of a main energy storage device 202 such as a lead storage battery corresponding to a main power source of the vehicle 10.

As illustrated in FIG. 1, the automated driving control device 12 includes an information detection unit 20, the automated driving control ECU 38, a driving device 200 (an acceleration/deceleration device 52, a braking device 54, and an steering device 56), and a notification device 58.

The acceleration/deceleration device 52 includes an engine ECU (engine electronic control unit) 111 and an engine 110 (driving source of the vehicle 10) whose operation is controlled by the engine ECU 111.

The braking device 54 includes a brake ECU (brake electronic control unit) that is not shown and a brake actuator (not shown) whose operation is controlled by the brake ECU.

The steering device 56 includes an electric power steering ECU (electric power steering electronic control unit, hereinafter referred to as EPSECU) 112 and an electric power steering device (hereinafter referred to as EPS) 113.

The information detection unit 20 includes a device (sensor, switch, or the like) that obtains information required for performing automated driving control. The information detection unit 20 includes, for example, a camera 22, a radar 24, a positioning device 26, an automated driving control start switch 28, a vehicle speed sensor 30, a yaw rate sensor 31, a steering torque sensor 32, an accelerator pedal sensor 34, and a brake pedal sensor 36.

The camera 22 is disposed on an inside upper part of a windshield of the vehicle 10, for example, and captures an image ahead of the vehicle 10. As the camera 22, a monocular camera or a stereo camera can be used. The radar 24 is disposed in a front grille of the vehicle 10, for example, and irradiates the periphery of the vehicle 10 with electromagnetic waves and detects reflection waves. As the radar 24, a radar such as a millimeter wave radar, a microwave radar, or a laser radar can be used. In addition, an infrared sensor can be also used. Note that a fusion sensor that integrates image information from the camera 22 and detection information from the radar 24 can be also used. The positioning device 26 includes, for example, a satellite positioning system, a gyroscope for inertial navigation, and a storage unit that stores map information including information of a section where the automated driving can be performed, to measure the position of the vehicle 10.

The automated driving control start switch 28 is provided for a meter panel of a dashboard 61 (see FIG. 2), and is operated by the driver H who intends to start the automated driving control. The vehicle speed sensor 30 is provided for each wheel (not shown) of the vehicle 10, and detects the travel speed of the vehicle 10.

The yaw rate sensor 31 detects the yaw rate of the vehicle 10. The steering torque sensor 32 detects steering torque generated in a steering shaft 71 (see FIG. 2). As the steering torque sensor 32, for example, a combination of a torsion bar and a differential transformer can be used. The accelerator pedal sensor 34 detects the stepping amount of an accelerator pedal (not shown). As the accelerator pedal sensor 34, a stroke sensor or a pressure sensor can be used. The brake pedal sensor 36 detects the stepping amount of a brake pedal (not shown). As the brake pedal sensor 36, a stroke sensor or a pressure sensor can be used.

When the CPU executes the programs, the automated driving control ECU 38 functions as an action plan creator 42, an acceleration/deceleration and braking controller 44, a steering controller 46, and a notification controller 50.

The action plan creator 42 is configured to obtain information required for the automated driving from the information detection unit 20, and create an action plan of the vehicle 10. For example, the action plan creator 42 is configured to set a travel route to a destination. In addition, the action plan creator 42 is configured to set a travel lane (travel traffic lane), and decide vehicle speed information, acceleration/deceleration and braking information, and steering information that cause the vehicle 10 to travel along the travel lane.

The acceleration/deceleration and braking controller 44 is configured to perform acceleration/deceleration and braking control on the basis of the vehicle speed information and the acceleration/deceleration and braking information decided by the action plan creator 42. The acceleration/deceleration and braking controller 44 outputs an acceleration/deceleration instruction to the acceleration/deceleration device 52, and outputs a braking instruction to the braking device 54. The steering controller 46 is configured to perform steering control on the basis of the steering information decided by the action plan creator 42. The steering controller 46 outputs a steering instruction to the steering device 56.

The notification controller 50 is configured to output a notification instruction on the basis of the information obtained by the information detection unit 20, and a recognition result and a determination result from the driver state monitoring device 40.

In the acceleration/deceleration device 52, in accordance with the acceleration/deceleration instruction output from the acceleration/deceleration and braking controller 44 of the automated driving control ECU 38, the engine ECU 111 operates a throttle valve or the like so as to operate the engine 110. By this operation, the vehicle 10 accelerates or decelerates.

In accordance with the braking instruction output from the acceleration/deceleration and braking controller 44 of the automated driving control ECU 38, the braking device 54 operates the brake actuator so as to operate a brake. By this operation, the vehicle 10 is braked. In accordance with the steering instruction output from the steering controller 46 of the automated driving control ECU 38, the steering device 56 operates an electric motor of the EPS 113. The electric motor rotates the steering shaft 71, for example. By this operation, the vehicle 10 changes its course. In accordance with the notification instruction output from the notification controller 50 of the automated driving control ECU 38, the notification device 58 operates a speaker and/or a display so as to perform notification.

As described with reference to FIG. 2, the monitoring camera device 14 includes the driver camera 60 and the monitor ECU 62.

The driver camera 60 is provided for, for example, the dashboard 61 (see FIG. 2) or the meter panel (not shown), and captures an image of a face (head) of the driver H or an upper half body including the face (head). As the driver camera 60, a near infrared camera can be used.

The monitor ECU 62 functions as a recognition device when the CPU executes the programs. The recognition device is configured to analyze the image that is captured by the driver camera 60, and recognize a periphery monitoring state of the driver H. Here, the recognition device recognizes the degree of the periphery monitoring by the driver H as the periphery monitoring state of the driver H. The degree of the periphery monitoring is recognized based on a posture, a direction of the face, a direction of eyeballs, a closing condition of eyelids, a head position, and the like of the driver H. For example, the recognition device recognizes the eyelids of the driver H. If the eyelids are closed, the recognition device recognizes that the driver H is in a dozing state. In addition, the recognition device recognizes the face or the eyeballs of the driver H. If the driver H faces left or right, the recognition device recognizes that the driver H is in a looking aside state. As a recognition method, a known method such as a method using a characteristic point and a pattern matching can be used. The recognition result from the recognition device is output to the automated driving control ECU 38.

The contact monitoring device 16 includes the steering wheel 70 and the contact determination ECU 74.

The steering wheel 70 constitutes a part of the steering device 56 that is operated by the driver H when the vehicle 10 travels. The steering wheel 70 includes a rim part 70*a* with an annular shape, a hub part 70*b* that is connected to the steering shaft 71, and a spoke part 70*c* that exists between the rim part 70*a* and the hub part 70*b*. The contact sensor 72 is formed at the rim part 70*a*.

The rim part 70*a* has a lamination structure and includes a core metal made of a metal material, a frame layer made of a resin material, a shield layer, and a sensor layer made of a conductive material that are not shown in this order from a central part to an outer side in a radial direction.

The contact determination ECU 74 that is connected to the contact sensor 72 provided for the rim part 70*a* detects whether the driver H grips the steering wheel 70 by his hands on the basis of an oscillation frequency f of an oscillation signal from an oscillator (not shown).

The oscillation frequency f based on an electrostatic capacitance C in a case where the driver H (human body) is not in contact with (does not grip) the sensor layer (to which oscillator is connected) of the steering wheel 70 (touch sensor 72) (this electrostatic capacitance C is referred to as non-contact electrostatic capacitance Cnt) is referred to as a non-contact oscillation frequency fnt. The non-contact oscillation frequency fnt is expressed by a following expression (1):

$$fnt = 1/2\pi (L \times Cnt)^{1/2} \quad (1)$$

where L is an inductance value of a coil that is connected to the oscillator.

The electrostatic capacitance C in a case where the driver H is in contact with (grips) the sensor layer of the steering wheel 70 (touch sensor 72) (this electrostatic capacitance C is referred to as a contact electrostatic capacitance Ct) is a value that is obtained by adding an electrostatic capacitance Ch of the driver H to the non-contact electrostatic capacitance Cnt.

Thus, the frequency f (referred to as a contact frequency ft) based on the electrostatic capacitance C (referred to as a contact electrostatic capacitance Ct, Ct=Cnt+Ch) in the case where the driver H (human body) is in contact with (grips) the sensor layer of the steering wheel 70 (touch sensor 72) is expressed by the following expression (2):

$$ft = 1/2\pi \{L \times (Cnt+Ch)\}^{1/2} \quad (2)$$

In consideration of the expression (1) and the expression (2), it is understood that the contact frequency ft in the case where the driver H (human body) grips the steering wheel 70 (touch sensor 72) is lower than the non-contact oscillation frequency fnt in the non-gripping case (in the case where the driver H does not grip the steering wheel 70). That is to say, a relation of ft<fnt is satisfied.

Note that each of L, Cnt, and Ch varies; thus, even if this variation causes a variation in the frequency f, for example, Cnt is set to be lower than Ch (Cnt<Ch) so that the relation of ft<fnt is satisfied.

That is to say, as the contact sensor 72, an electrostatic capacitance sensor that can detect whether the driver H grips the steering wheel 70 by his hands on the basis of the oscillation frequency f of the oscillator (not shown) is used.

A detection result as to whether gripping detection by the contact sensor 72 is normal (the driver H grips the steering wheel 70) or abnormal (the driver H does not grip the steering wheel 70) is supplied from the contact determination ECU 74 to the automated driving control ECU 38.

The steering wheel 70 is not limited to a steering part in an annular shape as shown in the drawing, and may be replaced by, for example, a butterfly type, a joystick, a button, or the like.

Figure 3:
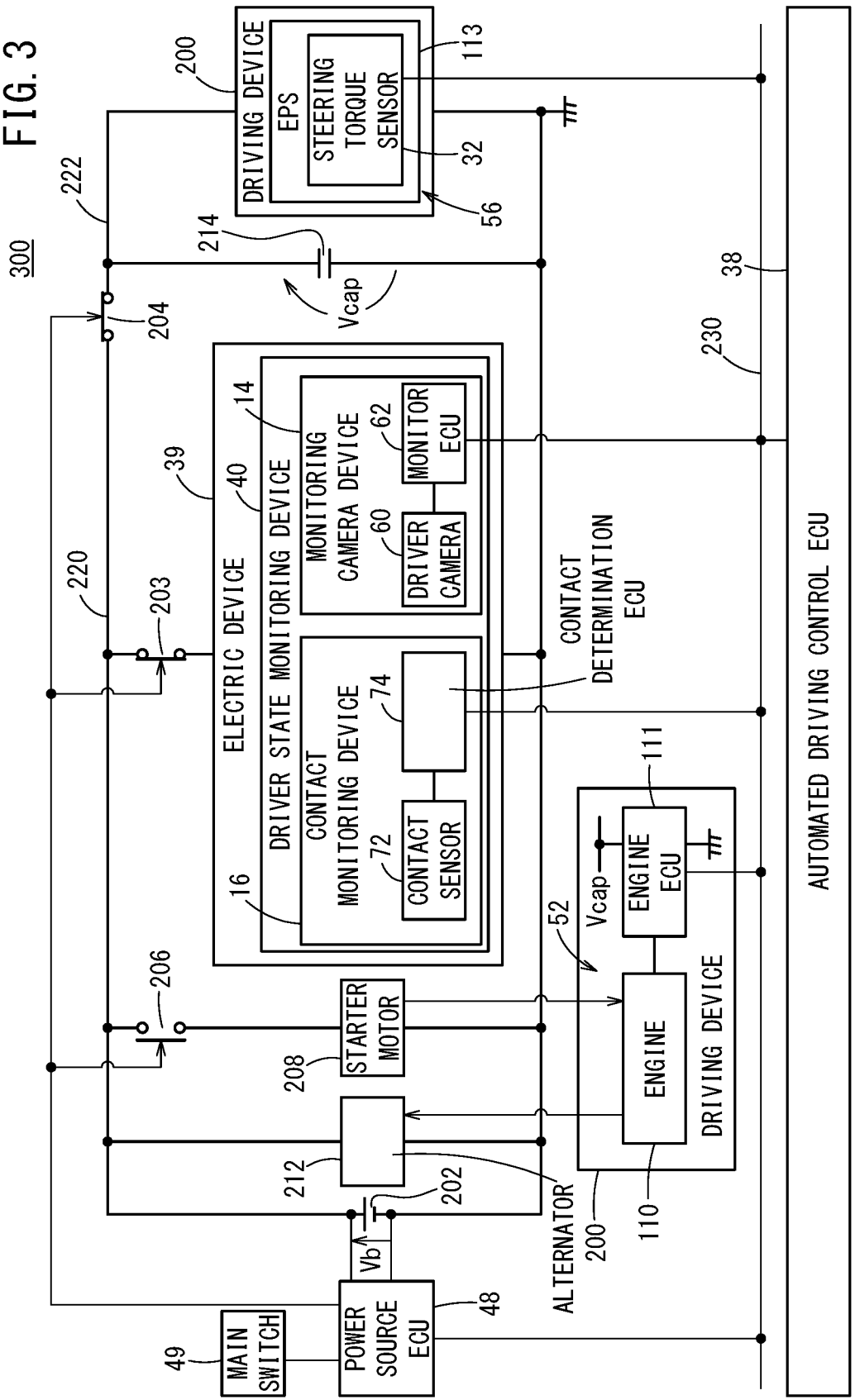
FIG. 3 is a circuit diagram of a power source system of the vehicle.

FIG. 3 is a circuit diagram of a power source system 300 of the vehicle 10. The power source system 300 basically includes the main energy storage device 202, an auxiliary energy storage device 214, switches 203, 204, 206 that switch between application and non-application (blocking) of the main power source voltage Vb and auxiliary power source voltage Vcap with respect to each load (in FIG. 3, an electric device 39, the driving device 200, and a starter motor 208). Note that a main switch 49 provided for the meter panel or the like is, for example, an ignition switch.

A lead storage battery that generates the main power source voltage Vb whose nominal voltage value is +12 [V] (normal value is higher than or equal to +12.6 [V]) is set as the main energy storage device 202, and a capacitor is set as the auxiliary energy storage device 214. The auxiliary energy storage device 214 is charged by the main energy storage device 202 when the switch 204 for supplying power to the driving device 200 is closed (state illustrated in FIG. 3).

To a path 220 on the main energy storage device 202 side of the switch 204, an alternator 212, the starter motor 208 connected to the switch 206 in series, and the electric device 39 connected to the switch 203 in series are connected in parallel with the main energy storage device 202.

The switch 206 is a switch for supplying the power to the starter motor 208. The switch 206 is temporarily closed in a transition of the main switch 49 from an OFF state to an ON state and in a return from an idle stop, and is open in the other cases such as in traveling (this state is shown in FIG. 3).

The switch 203 is a switch for supplying the power to the electric device 39 serving as what is called an auxiliary machine. The electric device 39 includes, in addition to the driver state monitoring device 40, an air-conditioning device (air-conditioner), a lighting device, and an audio device that are not shown, for example. Each ECU is included in the electric device 39.

The switch 203 is open when the main switch 49 is the OFF state. When the main switch 49 is in the other state, that is, the main switch 49 is in the ON state, the switch 203 is always closed (this state is shown in FIG. 3).

To a path 222 on the auxiliary energy storage device 214 side of the switch 204, the driving device 200 is connected. Note that in FIG. 3, as the driving device 200, the acceleration/deceleration device 52 including the engine 110 and the like, and the steering device 56 including the EPS 113 and the like, are shown at different places to help understanding.

To the engine 110 of the acceleration/deceleration device 52 of the driving device 200, the alternator 212 and the starter motor 208 are connected. To the engine ECU 111 that controls the engine 110, the auxiliary power source voltage Vcap corresponding to energy storage voltage is applied from the auxiliary energy storage device 214.

As describe above, the steering device 56 of the driving device 200 includes the EPS 113 including the steering torque sensor 32, and the auxiliary power source voltage Vcap is also applied to the steering device 56 from the auxiliary energy storage device 214.

FIG. 4 specifically shows a relation 250 among the on/off state of the main switch 49, the on/off state of various switches 203, 204, 206 for a state of the vehicle 10 (here, in traveling, idle stop, cranking (return from idle stop), and soaking (soak time) where the vehicle 10 is left alone or inoperative), and an operation state of the alternator 212.

This relation 250 is stored in a storage device of the power source ECU 48, and the current storage content (relation 250) is shared with other ECUs.

As indicated by FIG. 4, in the OFF state of the main switch 49, all the switches 203, 204, 206 are open so that the vehicle 10 is in the soak time (inoperative state).

On the other hand, when the main switch 49 is in the ON state and the vehicle 10 is traveling, the switches 203, 204 are closed so that the power is supplied to the electric device 39 and the driving device 200 with the main power source voltage Vb applied from the main energy storage device 202, and the switch 206 is open. In this traveling, the engine 110 drives the alternator 212 to generate the power. By this power generation energy, the main energy storage device 202 and the auxiliary energy storage device 214 are charged.

When the main switch 49 is in the on (ON) state and the vehicle 10 is in the idle stop state (vehicle speed=0), the switch 206 is opened while the switches 203, 204 remain closed. In this idle stop, the engine 110 is stopped, so that the alternator 212 is not driven and is in a non-power-generation state. Thus, in the idle stop, the main energy storage device 202 and the auxiliary energy storage device 214 are discharged in order to secure power to be consumed in the electric device 39 and the driving device 200. The main power source voltage Vb and the auxiliary power source voltage Vcap decrease simultaneously.

In this idle stop, when the vehicle 10 becomes a travel possible state again, for example a preceding vehicle starts to travel and an inter-vehicle distance with the preceding vehicle becomes large, it is predicted that the vehicle 10 is to return from the idle stop (in return from idle stop). In this return from the idle stop, the switch 204 for the driving device 200 is opened and immediately after that, the switch 206 is closed so that the starter motor 208 is driven and the engine 110 is cranked.

In this cranking, the starter motor 208 consumes excessive power. Therefore, there is a high possibility that the main power source voltage Vb of the main energy storage device 202 becomes considerably lower than the nominal voltage value +12 [V] to be lower than operation possible voltage Vactth of the driver state monitoring device 40 and the driving device 200.

Note that actually, the driver state monitoring device 40 and the driving device 200 have different operation possible voltages Vactth. However, in this embodiment, the driver state monitoring device 40 and the driving device 200 have the same value to help understanding and avoid complication.

When the cranking is started, large current flows to the starter motor 208. Initial voltage where the voltage becomes the lowest due to this large current is referred to as cranking start voltage Vcst. Note that the cranking start voltage Vcst slightly varies depending on the value of the main power source voltage Vb just before the start of the cranking.

In the cranking (when switch 206 is closed), the switch 204 for the driving device 200 is open so that the driving device 200 can operate. While the switch 204 for the driving device 200 is open, the auxiliary power source voltage Vcap is applied to the driving device 200 from the auxiliary energy storage device 214 in a non-charging state. While the auxiliary power source voltage Vcap is higher than or equal to the operation possible voltage (threshold voltage) Vactth, the driving device 200 can operate.

Note that in FIG. 3, to the path 220, an input side of a DC/DC converter that is not shown may be connected, and to the path 222, an output side of the DC/DC converter may be connected. Control may be performed so that, while the switch 204 is open, the DC/DC converter may be operated to make the auxiliary power source voltage Vcap become a predetermined voltage and the voltage in the path 222, that is, the auxiliary power source voltage Vcap decreases less.

As illustrated in FIG. 3, the power source ECU 48, the steering torque sensor 32, the engine ECU 111, the contact determination ECU 74, and the monitor ECU 62 are connected with each other through the communication line 230, and moreover connected to the automated driving control ECU 38.

[Operation]

Figure 5:
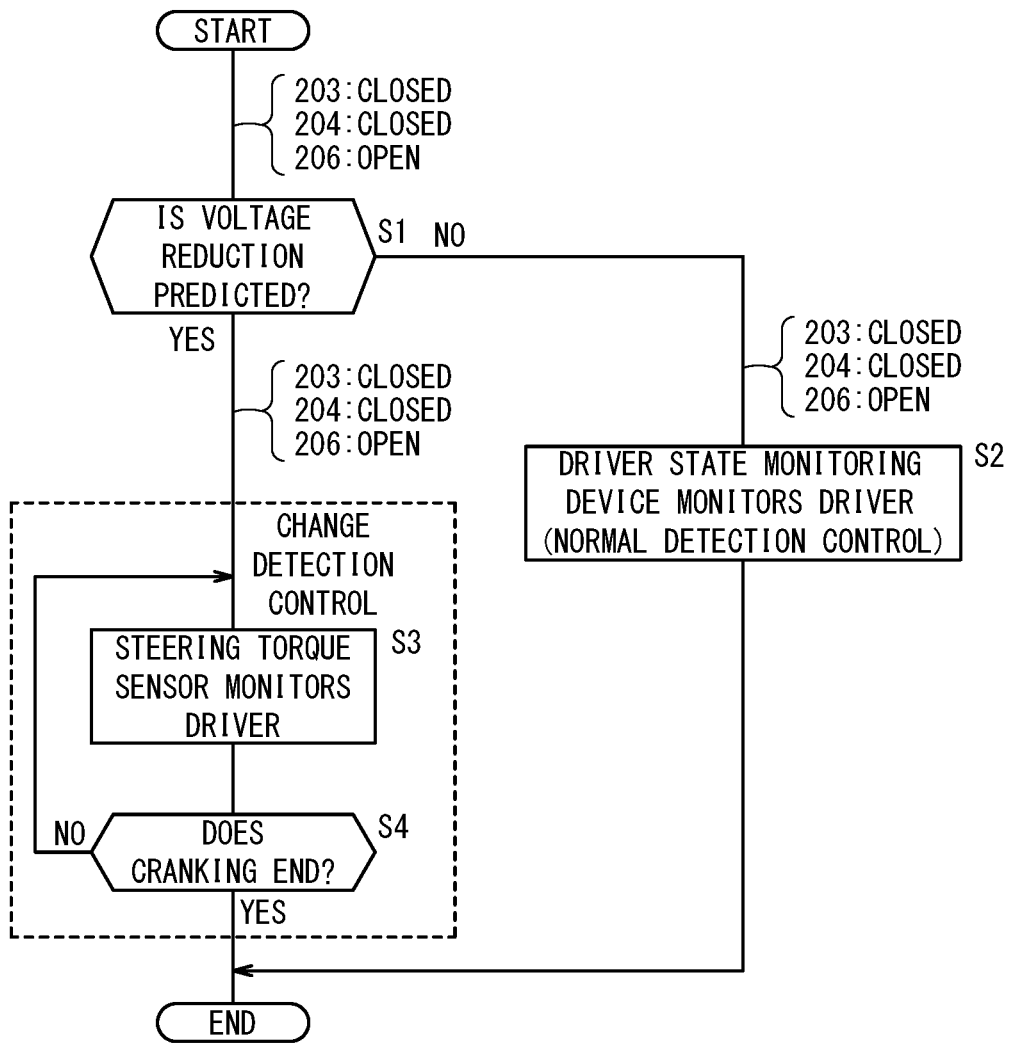
FIG. 5 is a flowchart that is used for describing an operation (switching an operation of monitoring the driver's state) of the vehicle including the driving assistance device according to the embodiment.

Next, a monitoring operation for the driver's state in the vehicle 10 that is basically configured as described above is described with reference to a flowchart in FIG. 5 and a timing diagram in FIG. 6 that are related to switching control of the power source system 300 by the power source ECU 48.

Note that it is the power source ECU 48 that executes the programs according to the flowchart.

When the vehicle 10 whose main switch 49 is the ON state is traveling (switch 203: closed, switch 204: closed, switch 206: open), while the power source ECU 48 keeps the switch 206 open and the switches 203, 204 closed and the alternator 212 charges, the main power source voltage Vb of the main energy storage device 202 is applied to the electric device 39 including the driver state monitoring device 40 through the path 220 and the switch 203, and also applied to the driving device 200 and the auxiliary energy storage device 214 through the path 220, the path 222, and the switch 204.

Then, in the traveling, in step S1, it is determined whether a voltage reduction state of the main power source voltage Vb is predicted.

Between a time point t0 and a time point t1 in the timing diagram, the vehicle 10 is traveling (traveling state), and the main power source voltage Vb is charged by the power generation of the alternator 212, so that the main power source voltage Vb varies but does not decrease substantially.

Therefore, a prediction determination for the voltage reduction in step S1 is negative (step S1: NO). In step S2, normal detection control is performed in which the driver state monitoring device 40 (the contact monitoring device 16 and the monitoring camera device 14) monitors the state of the driver H, while the switches are kept in a manner that the switch 203 is closed, the switch 204 is closed, and the switch 206 is open.

While the vehicle 10 is traveling, the vehicle speed may be decreased due to a traffic jam or the like. In this case, when the decrease of the vehicle speed is detected by the automated driving control ECU 38, what is called a low speed following automated traveling function {(also referred to as TJA: Traffic Jam Assist function)} or the like is performed. When the vehicle speed becomes zero value, the braking device 54 is operated through the acceleration/deceleration and braking controller 44, and the engine 110 is stopped so that the vehicle 10 is in the idle stop state.

At the time point t1 in the timing diagram, if the idle stop state is established (for example, as described above, the vehicle 10 stops in a traffic jam during traveling on an expressway, vehicle speed=0, in the automated braking state by the braking device 54), the alternator 212 does not generate the power. At this time point t1, the prediction determination for the voltage reduction in step S1 becomes positive (step S1: YES) and the monitoring of the state of the driver H shifts to the change detection control in step S3.

Note that at the time point t1, the closed state of the switch 203 for the electric device 39 continues. However, the switch 204 for the driving device 200 is controlled from the closed state to the open state in order to avoid the inoperability of the driving device 200 due to the reduction of the main power source voltage Vb in the next scheduled cranking (in return from the idle stop).

Figure 6:
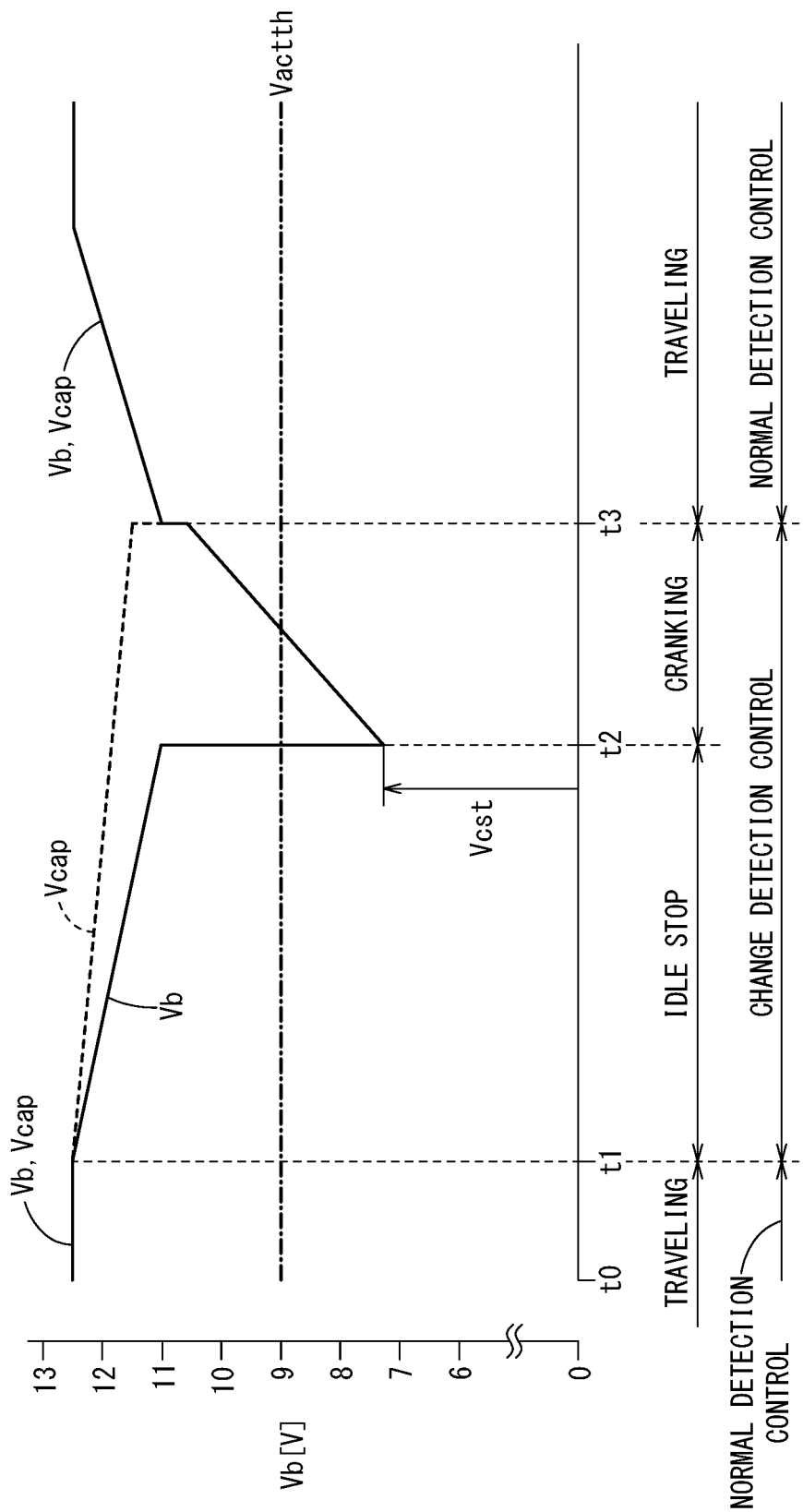
FIG. 6 is a timing diagram that is used for describing the operation (switching the operation of monitoring the driver's state) of the vehicle including the driving assistance device according to the embodiment.

As shown in the timing diagram in FIG. 6, in the idle stop after the time point t1, if the air-conditioning device (air-conditioner) or the like of the electric device 39 is operating, the main power source voltage Vb generated by the main energy storage device 202 decreases relatively rapidly.

In addition, in the idle stop after the time point t1, the driving device 200 is operable by the auxiliary energy storage device 214. Thus, the auxiliary power source voltage Vcap also gradually decreases due to an operation of the steering torque sensor 32 of the steering device 56, the operation of the brake actuator of the braking device 54, and the like.

In the change detection control in step S3, when the main power source voltage Vb rapidly decreases in the cranking (time point t2 to time point t3) that occurs after the idle stop (time point t1 to time point t2), it is predicted that the main power source voltage Vb becomes lower than the operation possible voltage Vactth (see voltage expressed by a dash-dot line in FIG. 6) of the driver state monitoring device 40 (the contact sensor 72 of the contact monitoring device 16 or the driver camera 60 of the monitoring camera device 14). Therefore, the driver state monitoring device 40 performs the monitoring of the state of the driver H using a detection value from the steering torque sensor 32 to which the auxiliary power source voltage Vcap is applied.

In the idle stop, if the driver H grips the steering wheel 70, an output waveform of the steering torque sensor 32 is a waveform in which vibration of the air-conditioning device of the electric device 39 or the like is suppressed and the automated driving control ECU 38 can distinguish the gripping and the non-gripping.

In the change detection control in step S3, when the preceding vehicle (not shown) starts to travel while the steering torque sensor 32 monitors the state of the driver H, the automated driving control ECU 38 detects that the inter-vehicle distance from the preceding vehicle increases by the output from the camera 22, the radar 24, or the like. At the time of this detection, the state becomes the return state from the idle stop state. In this return state, for a predetermined time, the switch 206 for the starter motor 208 is closed by the power source ECU 48, the starter motor 208 cranks the engine 110, and the engine 110 starts by cooperation with the engine ECU 111.

In this case, in step S4, it is monitored whether the cranking (see FIG. 6) ends.

As shown in the timing diagram in FIG. 6, when the cranking is started at the time point t2, the switch 206 is switched from the open state to the closed state, the large current flows to the starter motor 208 from the main energy storage device 202, and the main power source voltage Vb instantly decreases to the cranking start voltage Vcst (bottom voltage) that is lower than the operation possible voltage Vactth of the driver state monitoring device 40.

After the time point t2, the main power source voltage Vb increases with steep inclination. At the time point t3 when the cranking ends, the main power source voltage Vb recovers to the voltage that is higher than the operation possible voltage Vactth of the driver state monitoring device 40, and the switch 206 for the starter motor 208 is switched from the closed state to the open state.

The change detection control continues to monitor the driver H using the steering torque sensor 32 (step S4: NO→step S3) until the determination in step S4 as to whether the cranking ends becomes positive at the time point t3 (step S4: YES). After the time point t3 (step S4: YES), the process returns to step S1 and the monitoring of the state of the driver H returns to the normal detection control by the driver state monitoring device 40 where the process of step S1 to step S2 is repeated.

After the time point t3, the main energy storage device 202 (whose residual capacity corresponds to SOC: State Of Charge) and the stored power of the auxiliary energy storage device 214 recover gradually by the power generation of the alternator 212 as the engine 110 rotates, and the main power source voltage Vb and the auxiliary power source voltage Vcap (here, Vb=Vcap) increase gradually.

Summary of Embodiment and Modifications

As described above, the driving assistance device 11 according to the embodiment includes the power source ECU 48 and the automated driving control ECU 38 as the control device configured to enable the driving assistance function only when the state of the driver H monitored by the driver state monitoring device 40 is in a predetermined state {the state where the driver H is in what is called the driver-in-the-loop (the state where the driver H monitors the periphery)}. The main power source voltage Vb is applied from the main energy storage device 202 of the vehicle 10 to the driver state monitoring device 40.

When the variation of the main power source voltage Vb is predicted, the control device including the power source ECU 48 and the automated driving control ECU 38 is configured to change the normal technique for monitoring the state of the driver H to the different technique until the prediction of the variation of the main power source voltage Vb is cancelled.

For example, the control device predicts the voltage reduction state where the main power source voltage Vb is lower than the operation possible voltage Vactth of the driver state monitoring device 40. If the voltage reduction state is predicted, and in a period in which the voltage reduction state continues (in cranking from the time point t2 to the time point t3), the state of the driver H is monitored by the device other than the driver state monitoring device 40.

As described above, in this embodiment, the voltage reduction state where the main power source voltage Vb is lower than the operation possible voltage Vactth of the driver state monitoring device 40, is predicted. If the prediction of the voltage reduction state is made, and in the period in which the voltage reduction state continues, the state of the driver H is monitored by the steering torque sensor 32 that is the device other than the driver state monitoring device 40. Therefore, even in the period in which the voltage reduction state of the main power source voltage Vb continues, it can be monitored whether the driver H is in what is called the driver-in-the-loop state (where the driver H monitors the periphery), and the driving assistance (automated driving) can be continued.

Note that the driver state monitoring device 40 includes the driver camera 60 that is provided in the vehicle 10 and configured to photograph the driver H, and the contact sensor 72 that is provided for the steering wheel 70; however, the driver state monitoring device 40 may be at least one of the monitoring devices. In this case, the state of the face of the driver H, such as a face direction and a head position of the driver H, can be monitored by the driver camera 60, and the gripping state of the steering wheel 70 by the driver H can be monitored by the contact sensor 72.

The voltage reduction state where the main power source voltage Vb is lower than the operation possible voltage Vactth of the driver state monitoring device 40 is predicted. The control device including the power source ECU 48 and the automated driving control ECU 38 recognizes the period in which the voltage reduction state continues (from the time point t2 to the time point t3) as the return period from the idle stop of the vehicle 10 (in cranking of the engine 110). For example, in the return period from the idle stop during the automated following in the traffic jam by the driving assistance function, the state of the driver H can be monitored by the steering torque sensor 32 that is the device different from the driver state monitoring device 40. Thus, in the return period from the idle stop during the automated following in the traffic jam, the driving assistance function is prevented from being canceled because the driver H is determined not to be in what is called the driver-in-the-loop state (where the driver H monitors the periphery).

More specifically, if the driver state monitoring device 40 is the contact sensor 72, in the return period from the idle stop, the control device including the power source ECU 48 and the automated driving control ECU 38 applies the auxiliary power source voltage Vcap from the auxiliary energy storage device 214 to the EPS 113, and changes the monitoring the state of the driver H by the output from the contact sensor 72 to the monitoring by the output from the steering torque sensor 32 as the different device.

For example, in the return period from the idle stop during the low speed automated traveling in the traffic jam or the like, it can be determined whether the driver H is in what is called the driver-in-the-loop state (where the driver H monitors the periphery) by the output from the steering torque sensor 32 that is operated by the auxiliary energy storage device 214 instead of the output of the contact sensor 72 that is probably inoperable. Therefore, it is possible to prevent the driving assistance function from being cancelled in the return period from the idle stop.

[Modification 1]

As shown in FIG. 6, the lowest voltage in the idle stop and the cranking is the cranking start voltage Vcst.

It is understood that this cranking start voltage Vcst is 5 [V] or more.

In general, if the main power source voltage Vb is kept at 5 [V] or more, the operation of the ECU that operates with power source voltage Vb'=5 [V] that is stabilized by a three-terminal regulator is guaranteed.

Actually, the operation of the ECU such as the power source ECU 48 and the automated driving control ECU 38 that operate with the stabilized power source voltage Vb'=5 [V] is not stopped.

In view of this, another structure may be employed in which: if it is predicted that the main power source voltage Vb decreases in the idle stop, the cranking, or the like, the output of the contact sensor 72 is stored in the ECU as data just before those points (time point t1 or time point t2), and the data is read out as dummy data (the data indicating that the driver H gripped the steering wheel 70 just before the time point t1 or the time point t2) in the idle stop (time point t1 to time point t2) or the cranking (time point t2 to time point t3). Accordingly, the cancellation of the driving assistance function is prevented at the time of the idle stop and the return period from the idle stop (in cranking). As the ECU, another ECU such as a meter ECU may be used.

Even in this case, the driving assistance function is prevented from being canceled because the driver is determined not to be in what is called the driver-in-the-loop state (where the driver H monitors the periphery).

[Modification 2]

Figure 7:
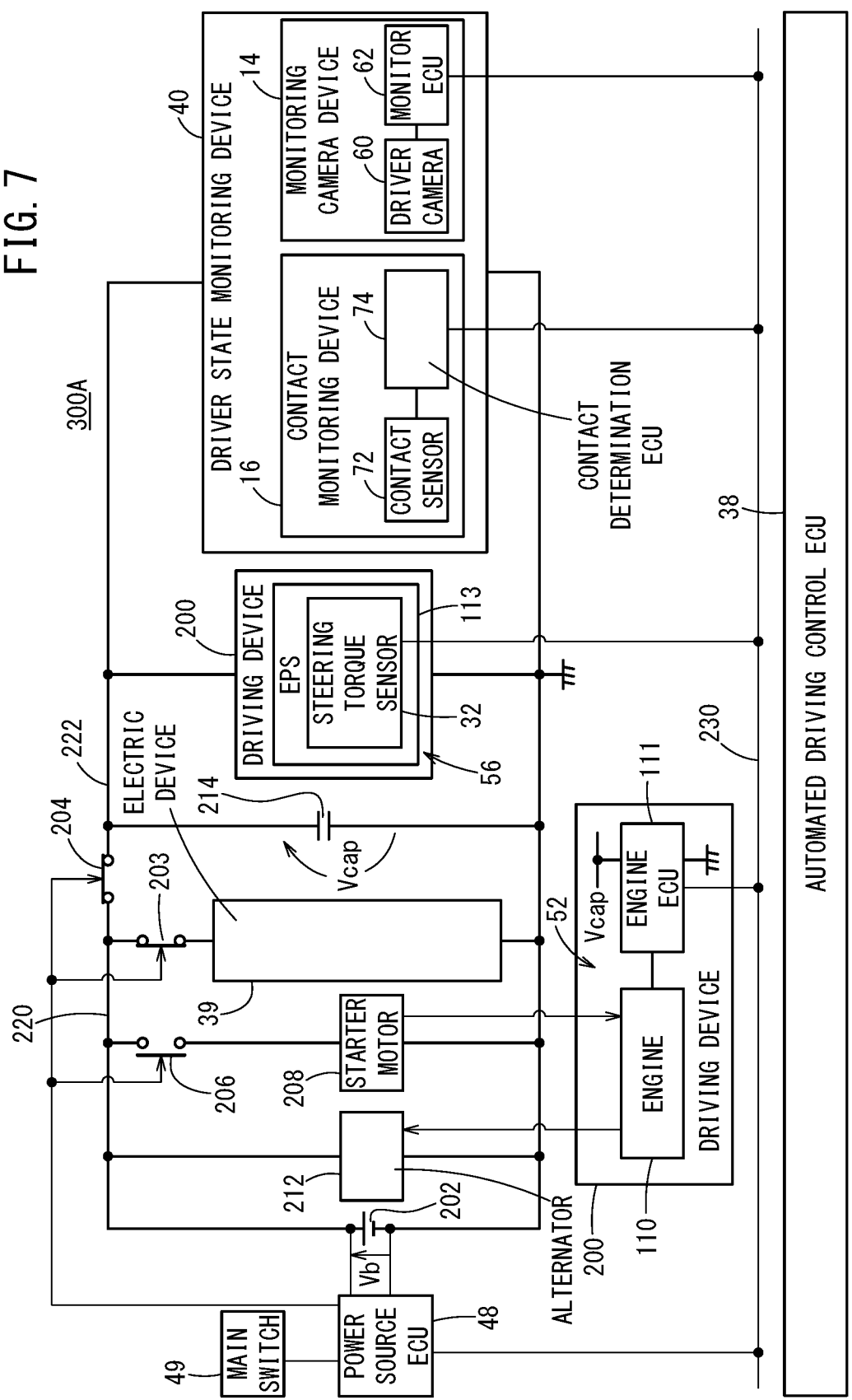
FIG. 7 is a circuit diagram of a power source system of a driving assistance device according to a modification.

As illustrated in FIG. 7, the vehicle 10 according to a modification 2 includes a power source system 300A that is different from the power source system 300 in FIG. 3. Among the electric devices 39 connected in series with the switch 203, the driver state monitoring device 40 is connected in parallel with the path 222 that is on the auxiliary energy storage device 214 side of the switch 204, to which the driving device 200 is connected. In this case, the auxiliary energy storage device 214 consumes more power in the idle stop and the cranking; however, it is needless to perform the change detection control.

The present invention is not limited to the embodiment above, and can employ various configurations without departing from the gist of the present invention. For example, instead of the contact sensor 72 that is an electrostatic capacitance type, a pressure sensor may be used.

The invention claimed is:

1. A driving assistance device comprising: an ECU configured to enable a driving assistance function of a vehicle only when a state of a driver monitored by a driver state monitoring device is in a predetermined state, a main power source voltage being applied from a main energy storage device of the vehicle to the driver state monitoring device,
   wherein when variation of the main power source voltage is predicted, the ECU is configured to change a normal technique for monitoring the state of the driver to a different technique until a prediction of the variation of the main power source voltage is cancelled;
   the driver state monitoring device is a contact sensor that is provided for a steering part;
   the driving assistance device further comprises an electric power steering device including a steering torque sensor, and an auxiliary energy storage device; and
   the ECU is configured to, in return from an idle stop, apply an auxiliary power source voltage from the auxiliary energy storage device to the electric power steering device, and change the normal technique for monitoring the state of the driver by an output from the contact sensor to a technique for monitoring by an output from the steering torque sensor.

2. A driving assistance device comprising: an ECU configured to enable a driving assistance function of a vehicle only when a state of a driver monitored by a driver state monitoring device is in a predetermined state, a main power source voltage being applied from a main energy storage device of the vehicle to the driver state monitoring device,
   wherein the driver state monitoring device is a driver camera configured to photograph the driver;
   the driving assistance device further comprises an electric power steering device including a steering torque sensor, and an auxiliary energy storage device;
   when variation of the main power source voltage is predicted, the ECU is configured to change a normal technique for monitoring the state of the driver to a different technique until a prediction of the variation of the main power source voltage is cancelled; and
   the ECU is configured to, in return from an idle stop, apply an auxiliary power source voltage from the auxiliary energy storage device to the electric power steering device, and change the normal technique for monitoring the state of the driver by an output from the driver camera to a technique for monitoring by an output from the steering torque sensor.

3. The driving assistance device according to claim 2, wherein the prediction of the variation of the main power source voltage is performed when a condition of an idle stop is satisfied or a condition of a return from the idle stop is satisfied.

4. The driving assistance device according to claim 2, wherein:
- the prediction of the variation of the main power source voltage is performed on a basis of a voltage reduction state where the main power source voltage is lower than an operation possible voltage of the driver state monitoring device; and
- in a period in which the voltage reduction state continues, the state of the driver is monitored by a device other than the driver state monitoring device.

* * * * *